Figure 1:
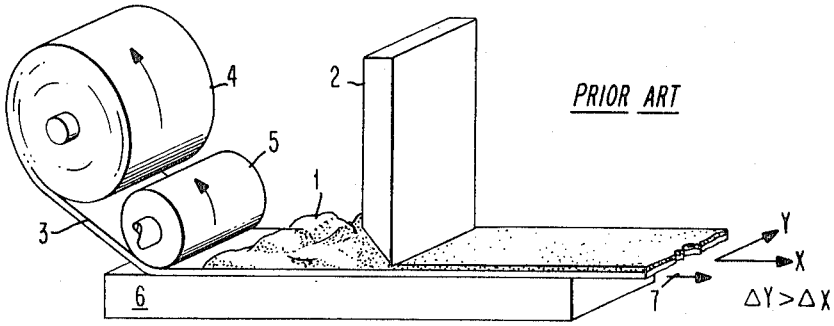
Figure 2:
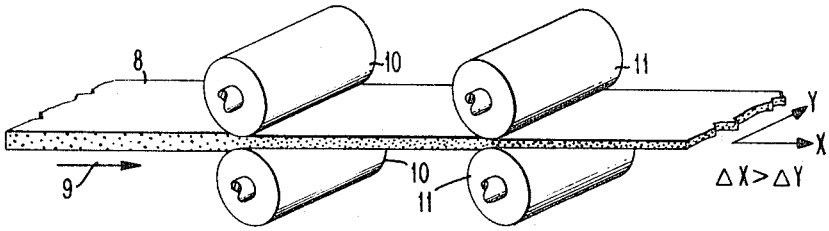
Figure 3:
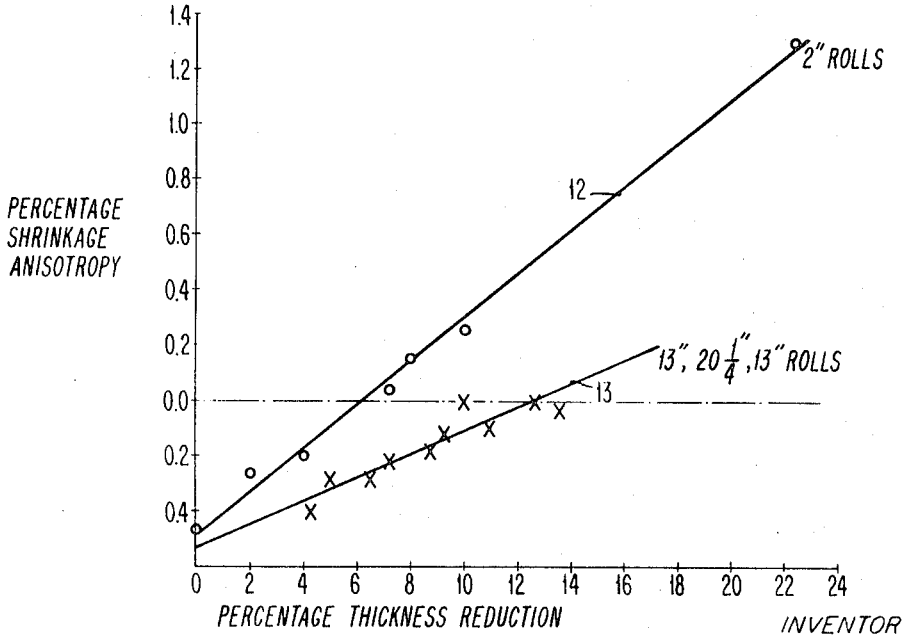

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 6

T909,004

CALENDERING DOCTOR BLADE CAST CERAMIC SHEETS TO CONTROL ANISOTROPIC FIRING SHRINKAGE

Wilfried K. Neuffer, Baden, Wurttemberg, Germany, assignor to International Business Machines Corporation, Armonk, N.Y.

Continuation of application Ser. No. 802,504, Feb. 26, 1969. This application Mar. 23, 1972, Ser. No. 237,567

Int. Cl. C04b *33/26, 35/10, 41/20*

U.S. Cl. 264—56

1 Sheet Drawing. 8 Pages Specification

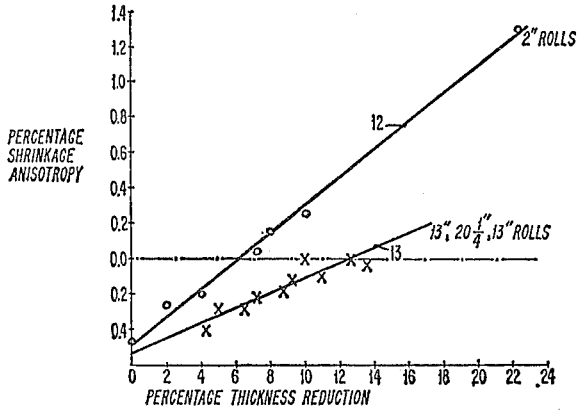

A green ceramic sheet produced by doctor blade casting of a particulate slip containing, e.g., finely divided alumina, polyvinyl butyral, dibutyl phthalate, a wetting agent and a solvent for the polyvinyl butyral, is characterized by shrinkage anisotropy, i.e., the shrinkage of the sheet measured after firing is less in the casting direction than in the transverse direction. This anisotropy can be substantially eliminated by subjecting the green sheet to an experimentally determined thickness reduction achieved by passing the dried sheets through a series of pressurized rolls which also elongates and densifies the dried sheet. Factors that are significant to the effect of thickness reduction on the elimination of shrinkage anisotropy are temperature, roll diameter, roll pressure, roll speed, and the composition of the casting slip. Also, another application is mentioned wherein the shape of the doctor blade and the material used in its construction can be specially designed and selected to reduce shrinkage anisotropy.

April 3, 1973 W. K. NEUFFER T909,004

CALENDERING DOCTOR BLADE CAST CERAMIC SHEETS
TO CONTROL ANISOTROPIC FIRING SHINKAGE

Original Filed Feb. 26, 1969

INVENTOR

WILFRIED K. NEUFFER

BY Robert J. Hoase

ATTORNEY